(No Model.)

F. W. HUESTIS.
RUBBER TIRE.

No. 558,689.  Patented Apr. 21, 1896.

WITNESSES
Francis E. Stanwood
Thomas Cleary

INVENTOR
Frederick W. Huestis.
by H. E. Lodge Atty

UNITED STATES PATENT OFFICE.

FREDERICK W. HUESTIS, OF BOSTON, MASSACHUSETTS.

RUBBER TIRE.

SPECIFICATION forming part of Letters Patent No. 558,689, dated April 21, 1896.

Application filed February 19, 1896. Serial No. 579,868. (No model.)

*To all whom it may concern:*

Be it known that I, FREDERICK W. HUESTIS, a citizen of the United States, residing at Boston, in the county of Suffolk and State of Massachusetts, have invented certain new and useful Improvements in Rubber Tires; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to rubber pneumatic tires for bicycles; and it consists in the peculiar formation and structural arrangement of the composing elements.

In the manufacture of rubber pneumatic tires it is necessary that the fabric which composes the same and which imparts the requisite strength should be resilient. In consequence of this peculiar action, which occurs at all times, due to irregularities in the surface of the roads, it is very essential that the various fibrous threads composing the fabric of the tire should not touch, otherwise friction occurs, the strength of the strands is impaired, and frequently the fabric is rendered worthless.

The object of my invention is to provide a resilient tire and at the same time prevent contact of the threads upon each other, while an economic method of manufacture is likewise obtained.

Figure 1:
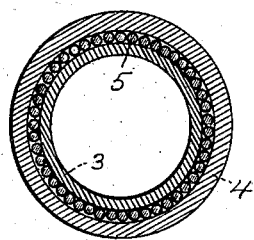
Figure 2:
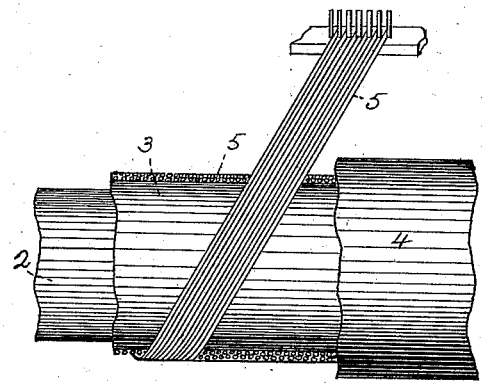
Figure 3:
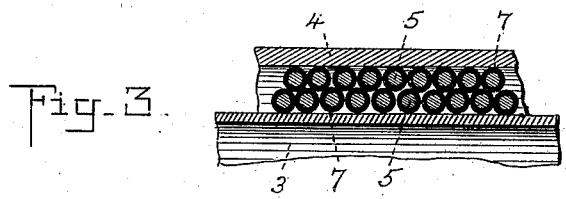

The drawings herewith presented represent, in Figure 1, a cross-section of a rubber tire embodying my invention. Fig. 2 is a sectional elevation of a tube for a tire mounted upon a mandrel and showing the winding of the threads. Fig. 3 is a cross-section, in part, of a rubber tire, much enlarged to show the specific structure of the several parts.

In said drawings, 2 represents a mandrel upon which the tube composing the tire is preferably formed.

In the manufacture of a tire under my invention several necessary features must be combined. First, the tube must be air-tight; secondly, it must be resilient and perfectly flexible, and, thirdly, the fibrous strands which impart the necessary strength to withstand the pneumatic pressure from within must not be contiguous. To combine these essential features and at the same time produce a cheap and enduring tire I assemble together an inner rubber tube 3, an outer rubber tube or sheath 4, and intermediary fibrous threads 5, grouped between the tubes to impart the necessary strength.

In the manufacture of this tire I proceed as follows: A mandrel 2 of the size of the inner diameter of the tire is first provided. Over this is drawn the inner tube 3, which is to be positioned thereupon, without folds or wrinkles. This tube is then wound with rubber-covered threads 5, which have been previously immersed in a bath of rubber cement or treated with rubber, which substance forms a coating of any thickness desired. This coating is indicated by the heavy black line at 7 in the drawings. These threads may be wound on singly and preferably obliquely of the tube or otherwise. After a suitable number of turns of these rubber-covered threads to make the tube either single, double, or treble ply, or more, as may be desired, the ends of the threads are subsequently made fast, and the outer tube—of rubber, somewhat thicker than the inner tube for durability of wear, since it serves as the wheel-tread—is then drawn over and about the threads. Thus it will be seen that the two tubes have a number of wraps of rubber-covered threads separately applied and interposed between them. The mandrel is now withdrawn, the ends of the tube joined together, and the tire then vulcanized. This act serves to make the several component parts unite, the rubber of the inner and outer tubes filling up the spaces or depressions between the threads, which are placed closely together. In this way a solid compact tire is produced. At the same time the threads, although laid very closely together, are completely and effectually separated from each other. Hence no chafing or abrasion can occur, and the strength of said threads is not impaired or damaged by the constant resilient action of the tire consequent upon use.

I am aware that fibrous threads have been embedded in strips of rubber by passing the same between calender-rolls; but to my knowledge fibrous threads provided with a homogeneous complete coating of rubber have never before been employed in this manner and wound separately about a rubber tube in the formation of a pneumatic tire. In the application of rubber-coated threads to produce a tire I am enabled to wrap one, two, three, or more windings and still produce a light tire, because I use a minimum amount of rubber in the shape of a rubber-coating, whereas with the threads embedded in a rubber band or strip an excess of rubber is used, and in consequence should more than one wrapping be used the weight of the tire is greatly increased.

What I claim is—

1. A tire for vehicles composed of two tubes of rubber, an inner tube and an outer tube, and a wrapping of fibrous rubber-coated threads interposed between the tubes said threads being wound severally about the inner tube, substantially as specified.

2. A tire for pneumatic use, consisting of an inner tube, a wrapping of fibrous threads having a homogeneous rubber coating and separately applied about the inner tube, and an outer tube to inclose the fibrous wrapping, the whole to be subsequently vulcanized, substantially as explained.

In testimony whereof I affix my signature in presence of two witnesses.

FREDERICK W. HUESTIS.

Witnesses:
H. E. LODGE,
FRANCIS C. STANWOOD.